(12) United States Patent
Qian et al.

(10) Patent No.: US 10,869,097 B2
(45) Date of Patent: Dec. 15, 2020

(54) TELEVISION BOARD CARD, TELEVISION SYSTEM AND TELEVISION SYSTEM CONFIGURATION METHOD

(71) Applicant: AMLOGIC (SHANGHAI) CO., LTD., Shanghai (CN)

(72) Inventors: Lei Qian, Shanghai (CN); Nengwen Chen, Shanghai (CN); Yu Fang, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/657,499

(22) Filed: Oct. 18, 2019

(65) Prior Publication Data

US 2020/0128299 A1    Apr. 23, 2020

(30) Foreign Application Priority Data

Oct. 19, 2018   (CN) .......................... 2018 1 1223990

(51) Int. Cl.
*H04N 21/485*   (2011.01)
*H04N 5/46*     (2006.01)
*H04N 7/01*     (2006.01)

(52) U.S. Cl.
CPC ............. *H04N 21/485* (2013.01); *H04N 5/46* (2013.01); *H04N 7/01* (2013.01)

(58) Field of Classification Search
CPC ......... H04N 21/485; H04N 21/46; H04N 7/01
See application file for complete search history.

(56) References Cited

U.S. PATENT DOCUMENTS

| 7,505,089 B2 | 3/2009 | Borseth |
| 2007/0153122 A1 | 7/2007 | Ayite et al. |
| 2008/0013725 A1* | 1/2008 | Kobayashi .............. H04L 29/06 380/203 |

(Continued)

FOREIGN PATENT DOCUMENTS

| CN | 101179684 A | 5/2008 |
| CN | 101706675 A | 5/2010 |
| CN | 101742182 A | 6/2010 |

(Continued)

OTHER PUBLICATIONS

Extended European Search Report for European Patent Application No. 19204018.6, dated Nov. 28, 2019, 7 pages.

(Continued)

*Primary Examiner* — Michael E Teitelbaum
(74) *Attorney, Agent, or Firm* — Withrow & Terranova, PLLC

(57) ABSTRACT

A television board card, a television system and a television system configuration method are disclosed. The television board card includes a storage unit configured to store a configuration file, the configuration file comprising a country code form in which a plurality of country codes are preconfigured and system configuration information corresponding to each of the plurality of country codes. The television board card further includes a receiving unit configured to receive a configuration command, and a processing unit configured to analyze the configuration file and select the corresponding system configuration information for configuration according to the configuration command.

5 Claims, 1 Drawing Sheet

(56) References Cited

U.S. PATENT DOCUMENTS

2009/0158368 A1* 6/2009 Cirrincione .............. H04N 5/50
                                                        725/110
2011/0191451 A1* 8/2011 Kuo ..................... G06F 15/177
                                                        709/220

FOREIGN PATENT DOCUMENTS

| CN | 102164259 A | 8/2011 |
| CN | 107426608 A | 12/2017 |

OTHER PUBLICATIONS

Search Report for Chinese Patent Application No. CN 201811223990.X, dated Mar. 6, 2020, 2 pages.
First Office Action for Chinese Patent Application No. CN 201811223990.X, dated Mar. 16, 2020, 14 pages.
Second Office Action for Chinese Patent Application No. CN 201811223990.X, dated Aug. 10, 2020, 14 pages.

* cited by examiner

TELEVISION BOARD CARD, TELEVISION SYSTEM AND TELEVISION SYSTEM CONFIGURATION METHOD

CROSS-REFERENCE TO RELATED APPLICATION

The present application claims priority to and the benefit of Chinese Patent Application No. CN 201811223990.X, filed on Oct. 19, 2018, the entire content of which is incorporated herein by reference.

BACKGROUND OF THE INVENTION

Field of the Invention

The invention relates to the field of televisions, and more particularly, to a television board card, a television system and a television system configuration method.

Description of the Related Art

A standard for television signals (a standard of broadcasting that involves the use of a specific system and technology in a country or a region), simply referred to as system, is a technical standard for displaying television images and sound signals. At present, common television broadcasting systems are PAL (Phase-Alternative Line), NTSC (National Television Systems Committee), and SECAM (Sequential Coleur Avec Memoire). The television systems may be different in different countries. For example, PAL is used in most regions across China, NTSC is used in Japan, Korea, Southeast Asia, and western countries including the United States, and SECAM is used in Russia.

It has been found that each country has a fixed television system. However, for manufactures of television chips, a chip may support a plurality of DTV (Digital Television) systems and ATV (Analog Television) systems. For example, the existing Amlogic TELX chip supports DTV systems such as ATSC, DVB-C, ISDB-T, and supports ATV systems such as NTSC and PAL; the Amlogic TXL chip may support DTV systems such as DTMB and DVB-C, and may support ATV systems such as NTSC and PAL.

With the fact that television system codes are fixed, during the research & development process for televisions, addition of one more system to a specific country needs to be done through the modification of code manually. Of note, such a testing process is quite complicated, and it is not easy to implement.

SUMMARY OF THE INVENTION

In order to solve the problem that the existing television system codes may not support systems of all countries, the present invention provides a television board card, a television system and a television system configuration method, which are intended to support the systems of all the countries.

A television board card, comprising: a storage unit configured to store a configuration file, the configuration file comprising a country code form in which a plurality of country codes are preconfigured and system configuration information corresponding to each of the plurality of country codes; a receiving unit configured to receive a configuration command; and a processing unit configured to analyze the configuration file and select the corresponding system configuration information for configuration according to the configuration command.

Preferably, the system configuration information comprises input signal type data, and/or color system data, and/or audio system data, and/or channel searching mode data.

Preferably, the processing unit comprises: an analyzing module configured to analyze the configuration file and obtain the country code form and the system configuration information corresponding to each of the plurality of country codes; a matching module configured to match country information from the configuration command with one of the plurality of country codes in the obtained country code form, and to obtain a matching country code; and a configuration module configured to select the corresponding system configuration information for configuration according to the matching country code.

Preferably, the configuration module is configured to select, according to the matching country code, the corresponding system configuration information for a display configuration of the input signal type data, for the display configuration of the color system data, for the display configuration of the audio system data, and for the configuration of the channel searching mode data.

A television system, comprising the above-mentioned television board card, is further provided in the present invention.

A television system configuration method is further provided in the present invention, in which a storage unit is provided for storing a configuration file, the configuration file comprising a country code form in which a plurality of country codes are preconfigured and system configuration information corresponding to each of the plurality of country codes; wherein the television system configuration method comprises the steps of: receiving a configuration command; analyzing the configuration file; and selecting the corresponding system configuration information for configuration according to the configuration command.

Preferably, the system configuration information comprises input signal type data, and/or color system data, and/or audio system data, and/or channel searching mode data.

Preferably, the step of analyzing the configuration file comprises: analyzing the configuration file, and obtaining the country code form and the system configuration information corresponding to each of the plurality of country codes.

Preferably, the step of selecting the corresponding system configuration information for configuration according to the configuration command comprises: matching country information from the configuration command with one of the plurality of country codes in the obtained country code form, and obtaining a matching country code; and selecting the corresponding system configuration information for configuration according to a matching country code.

Preferably, the step of selecting the corresponding system configuration information for configuration according to the matching country code comprises: selecting, according to the matching country code, the corresponding system configuration information for a display configuration of the input signal type data, for the display configuration of the color system data, for the display configuration of the audio system data, and for the configuration of the channel searching mode data.

The above-mentioned technical solution has the following advantageous effects: in this technical solution, the storage unit stores the country code form and the system configuration information, the processing unit is employed to analyze the configuration file and select the corresponding system configuration information for display according to the configuration command, so that the purpose of execution of corresponding configuration according to different countries is achieved and the application range of the television board card is improved.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
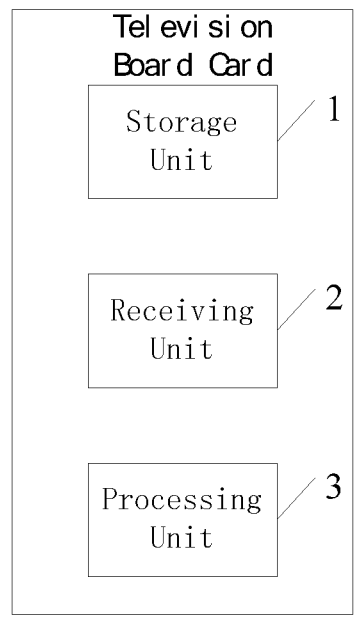
FIG. 1 is a block diagram showing a television board card according to an embodiment of the present invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, certain exemplary embodiments according to the present disclosure will be described with reference to the accompanying drawings.

As shown in FIG. 1, a television board card may comprise: a storage unit 1 configured to store a configuration file, the configuration file comprising a country code form in which a plurality of country codes are preconfigured and system configuration information corresponding to each of the plurality of country codes; a receiving unit 2 configured to receive a configuration command; and a processing unit 3 configured to analyze the configuration file and select the corresponding system configuration information for configuration according to the configuration command.

Furthermore, the system configuration information comprises input signal type data, and/or color system data, and/or audio system data, and/or channel searching mode data.

It should be noted that configuration information of all systems supportable by each country is stored in the configuration file for execution of corresponding system configuration upon different countries.

In this embodiment, the storage unit 1 stores the country code form and the system configuration information, the processing unit 3 is employed to analyze the configuration file, and to select the corresponding system configuration information for display according to the configuration command, so that the purpose of execution of corresponding configuration according to different countries is achieved and the application range of the television board card is improved.

In a preferred embodiment, the processing unit 3 may comprise: an analyzing module configured to analyze the configuration file and obtain the country code form and the system configuration information corresponding to each of the plurality of country codes; a matching module configured to match country information from the configuration command with one of the plurality of country codes in the obtained country code form, and to obtain a matching country code; and a configuration module configured to select the corresponding system configuration information for configuration according to the matching country code.

It is noted that after the television board card is turned on, the analyzing module is used to analyze the configuration file; the matching module is used to match a country code in the country code form with the configuration command, so as to determine which country is the target for the configuration; and configuration of the corresponding system configuration information, by the configuration module, is done according to the matching result, so that the purpose of execution of corresponding configuration according to different countries is achieved.

In a preferred embodiment, the configuration module selects, according to the matching country code, the corresponding system configuration information for a display configuration of the input signal type data, for the display configuration of the color system data, for the display configuration of the audio system data, and for the configuration of the channel searching mode data.

In this embodiment, when configuring the television board card, an operator shall display, according to corresponding country codes, a corresponding player interface (display system), function for setup menu (color system and audio system) and the channel searching mode.

In practice, a configuration file "tvconfig.txt" may comprise all the countries to be supported by the television, and all DTV systems and ATV systems used in those countries. After the television board card is turned on, all the countries in the configuration file "tvconfig.txt" are analyzed. Afterwards, what system from a certain country is used is determined according to a received configuration command. For example, five countries (China, America, India, France, and Brazil) are added to the configuration file "tvconfig.txt" (China comes first here, indicating that the database variables, current_country, is "CN" on the default settings, and the interface may be displayed as required for channel searching and player interface which belong to China, when the television board card is turned on first time without any user settings.)

The example of the configuration file "tvconfig.txt" is as follows:

[country start]
   code="CN"
   name="China"
   DTV="DTMB"
   ATV_color="NTSC, PAL"
   ATV_sound="D/K,I,B/G,M,L"
   search_mode="auto,manual"
[country end]
[country start]
   code="US"
   name="America"
   DTV="ATSC-T,ATSC-C"
   ATV_color="NTSC"
   ATV_sound="D/K,I"
   search_mode="auto, number"
[country end]
[country start]
   code="IN"
   name="India"
   DTV="None"
   ATV_color="NTSC, PAL"
   ATV_sound="D/K,I,B/G,M,L"
   search_mode="auto,manual"
[country end]
[country start]
   code="FR"
   name="France"
   DTV="DVB"
   ATV_color="SECAM"
   ATV_sound="D/K,I,B/G,"
   search_mode="auto, number"
[country end]
[country start]
   code="BR"
   name="Brazil"
   DTV="ISDB-T"
   ATV_color="NTSC, PAL"
   ATV_sound="D/K,I,B/G,M,L"
   search_mode="auto,manual"
[country end]

wherein, "code" represents a country code for matching a value of current_country; "name" represents the name of the country displayed on the interface; "DTV" represents the DTV systems supported by this country, and when "DTV" is shown as "None", it means this country does not support DTV and that a DTV-related interface is not displayed; "ATV_color" represents ATV color systems supported by the current country; "ATV_sound" represents the ATV sound system supported by the current country; "search_mode" represent the channel searching mode supported by the current country, wherein "auto" refers to automatic search of channel, "manual" refers to manual search of channel, and "number" refers to search by clicking on numeric keys.

After analyzing of the configuration file "tvconfig.txt" is completed, the configuration is saved to a core class "TvConfig", and an output interface is provided for allowing an interface display module and a configuration execution module to read and query data. For example, the following interfaces are involved: interface getCurrentCountry( ) read the value of current_country, such as "CN" "USA"; interface getCountryList( ): read a country list: interface getDtvMode (String country): query the type of DTV system that the current country supports by importing a country code; interface getAtvColorMode(String country): query the type of ATV color system that the current country supports by importing a country code; interface getAtvSoundMode (String country): query the type of ATV sound system that the current country supports by importing a country code; interface getSearchMode(String country): query the type of search mode that the current country supports by importing a country code.

All the interfaces are displayed through country configurations read from the core class "TvConfig." And channel searching and playing, provision of different television functions are achieved according to the configurations. The configuration in the core class "TvConfig" is the unique factor which decides the interface and functions.

The invention generates a decisive factor through a configuration file, so as to enable the interface display module and the configuration execution module to achieve related functions according to a unified country code form, thereby resolving the problem that configurations are not locked in the codes, and reducing maintenance workload; in the present invention, changes may be made in a television system of a country and its related functions simply by modifying configurations and restarting a platform, such that debugging efficiency is improved, development resources are saved, and clients' unique demands may be met in a more efficient way; also, a set of codes may be applicable to all of the television systems, and chip improvement for television chip manufacturers is greatly improved.

A television system, comprising the above-mentioned television board card, is further provided in the present invention.

A television system configuration method is further provided in the present invention, the method comprising a step of providing a storage unit for storing a configuration file, the configuration file comprising a country code form in which a plurality of country codes are preconfigured and system configuration information corresponding to each of the plurality of country codes.

Figure 2:
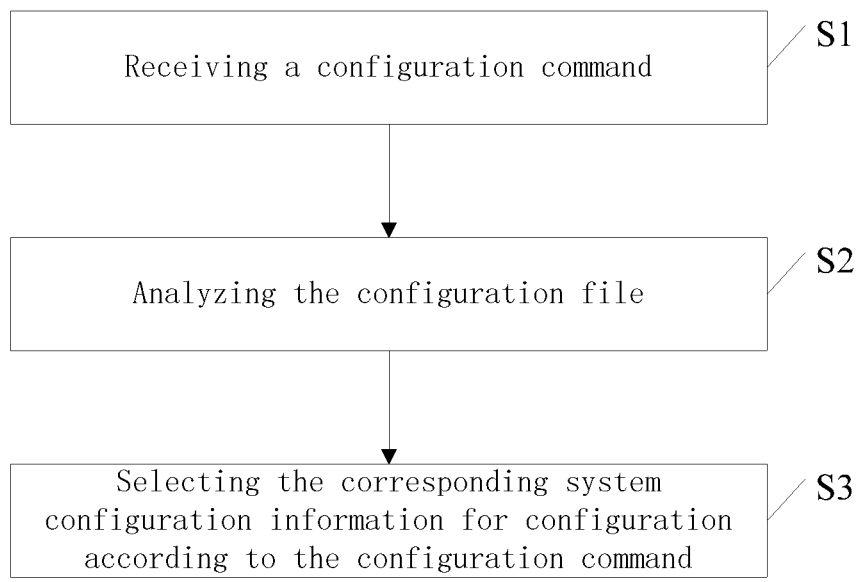
FIG. 2 is a flowchart showing a television system configuration method according to an embodiment of the present invention.

As shown in FIG. 2, wherein the television system configuration method comprises the steps of: Step S1, receiving a configuration command; Step S2, analyzing the configuration file; and Step S3, selecting the corresponding system configuration information for configuration according to the configuration command.

Furthermore, the system configuration information comprises: input signal type data, and/or color system data, and/or audio system data, and/or channel searching mode data.

It should be noted that configuration information of all systems supportable by each country is stored in the configuration file for execution of corresponding system configuration according to different countries.

In this embodiment, the configuration file is analyzed, and corresponding system configuration information is selected for display according to the configuration command, so that the purpose of execution of corresponding configuration according to different countries is achieved and the application range of the television board card is improved.

In a preferred embodiment, the step of analyzing the configuration file comprises: analyzing the configuration file, and obtaining the country code form and the system configuration information corresponding to each of the plurality of country codes.

In a preferred embodiment, the step of selecting the corresponding system configuration information for configuration according to the configuration command comprises: matching country information from the configuration command with one of the plurality of country codes in the obtained country code form, and obtaining a matching country code; and selecting the corresponding system configuration information for configuration according to a matching country code.

In a preferred embodiment, the step of selecting the corresponding system configuration information for configuration according to the matching country code comprises: selecting, according to the matching country code, the corresponding system configuration information for a display configuration of the input signal type data, for the display configuration of the color system data, for the display configuration of the audio system data, and for the configuration of the channel searching mode data.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A television board card, comprising:
    a storage unit configured to store a configuration file, the configuration file comprising a country code form in which a plurality of country codes are preconfigured and system configuration information corresponding to each of the plurality of country codes;
    a receiving unit configured to receive a configuration command; and
    a processing unit configured to analyze the configuration file and select the corresponding system configuration information for configuration according to the configuration command, wherein the processing unit comprises:
    an analyzing module configured to:
        analyze the configuration file and obtain the country code form and the system configuration information corresponding to each of the plurality of country codes;
        save the system configuration information to a core class TvConfig; and
        provide an output interface to allow an interface display module and a configuration execution module to read and query data;
    a matching module configured to:
        match country information from the configuration command with one of the plurality of country codes in the country code form; and
        obtain a matching country code; and
    a configuration module configured to:
        select the corresponding system configuration information for configuration according to the matching country code, wherein the configuration module is configured to select, according to the matching country code, the corresponding system configuration information for a display configuration of input signal type data, for a display configuration of color system data, for a configuration of audio system data, and for a configuration of channel searching mode data.

2. The television board card of claim 1, wherein the system configuration information comprises input signal type data, and/or color system data, and/or audio system data, and/or channel searching mode data.

3. A television system comprising a television board card comprising:
    a storage unit configured to store a configuration file, the configuration file comprising a country code form in which a plurality of country codes are preconfigured and system configuration information corresponding to each of the plurality of country codes;
    a receiving unit configured to receive a configuration command; and
    a processing unit configured to analyze the configuration file and select the corresponding system configuration information for configuration according to the configuration command, wherein the processing unit comprises:
    an analyzing module configured to:
        analyze the configuration file and obtain the country code form and the system configuration information corresponding to each of the plurality of country codes;
        save the system configuration information to a core class TvConfig; and
        provide an output interface to allow an interface display module and a configuration execution module to read and query data;
    a matching module configured to:
        match country information from the configuration command with one of the plurality of country codes in the country code form; and
        obtain a matching country code; and
    a configuration module configured to:
        select the corresponding system configuration information for configuration according to the matching country code, wherein the configuration module is configured to select, according to the matching country code, the corresponding system configuration information for a display configuration of input signal type data, for a display configuration of color system data, for a configuration of audio system data, and for a configuration of channel searching mode data.

4. A television system configuration method, wherein a storage unit is provided for storing a configuration file, the configuration file comprising a country code form in which a plurality of country codes are preconfigured and system configuration information corresponding to each of the plurality of country codes, wherein the television system configuration method comprises the steps of:
    receiving a configuration command;
    analyzing the configuration file, and obtaining the country code form and the system configuration information corresponding to each of the plurality of country codes, wherein the system configuration information is saved to a core class TvConfig, an output interface is provided for allowing an interface display module and a configuration execution module to read and query data; and
    selecting the corresponding system configuration information for configuration according to the configuration command, wherein the step of selecting the corresponding system configuration information for configuration according to the configuration command comprises matching country information from the configuration command with one of the plurality of country codes in the country code form, and obtaining a matching country code; and
    selecting the corresponding system configuration information for configuration according to a matching country code, selecting, according to the matching country code, the corresponding system configuration information for a display configuration of input signal type data, for a display configuration of color system data, for a configuration of audio system data, and for a configuration of channel searching mode data.

5. The television system configuration method of claim 4, wherein the system configuration information comprises input signal type data, and/or color system data, and/or audio system data, and/or channel searching mode data.

\* \* \* \* \*